United States Patent [19]

Fukuyama et al.

[11] 4,347,609
[45] Aug. 31, 1982

[54] METHOD AND SYSTEM FOR TRANSMISSION OF SERIAL DATA

[75] Inventors: Hiroomi Fukuyama, Hachioji; Shinichi Isobe, Tachikawa; Mikio Yonekura, Hino; Minoru Kataoka, Tokyo, all of Japan

[73] Assignee: Fujitsu Fanuc Limited, Tokyo, Japan

[21] Appl. No.: 179,935

[22] Filed: Aug. 20, 1980

[30] Foreign Application Priority Data

Sep. 4, 1979 [JP] Japan .................... 54-113253

[51] Int. Cl.³ .................... G06F 11/08; H04L 1/14
[52] U.S. Cl. .................... 371/34
[58] Field of Search .................... 371/34, 32

[56] References Cited

U.S. PATENT DOCUMENTS

| | | | |
|---|---|---|---|
| 3,453,592 | 7/1969 | Ishii et al. | 371/34 |
| 3,805,234 | 4/1974 | Masters | 371/34 |
| 3,868,633 | 2/1975 | Nuese | 371/34 |
| 3,910,322 | 10/1975 | Hardesty, Jr. et al. | 371/34 |
| 4,070,648 | 1/1978 | Mergenthaler et al. | 371/34 |

*Primary Examiner*—Charles E. Atkinson

*Attorney, Agent, or Firm*—Staas & Halsey

[57] ABSTRACT

A method and system for transmitting N-bit serial data (where N is a positive number) in the form of a bit serial, including a data sending circuit, a data receiving circuit and data transmission lines. The system includes a first data transmission line; a second transmission line; a transfer circuit, provided in the receiving means, for sending back to the data sending circuit through the second data transmission line, the bit content of received N-bit data each time one bit of the N-bit data is received through the first data transmission line; a comparison circuit, provided in the data sending circuit, for comparing the transmitted bit content and the bit content sent back on the second data transmission line; and a detection circuit provided in the data receiving circuit. The data sending circuit is adapted to transmit as a start bit a signal of a prescribed logical value before the N-bit serial data is sent, and, as an alarm bit, the results of the comparison after the N-bit serial data has been sent. The detection circuit detects whether the logical values of the start bit and the alarm bit are prescribed logical values, so that a transmission error or a break in a transmission line can be detected.

9 Claims, 3 Drawing Figures

METHOD AND SYSTEM FOR TRANSMISSION OF SERIAL DATA

BACKGROUND OF THE INVENTION

This invention relates to a method and system for the transmission of serial data, and more particularly to a method and system for the transmission of serial data that enable transmission errors and the breakage or disconnection of transmission lines to be detected in a reliable manner.

Data transmission systems which are widely known in the art have two data transmission paths, namely a sending line and a receiving line, over which serial data can be sent and received between two units in both directions in the form of a bit serial. If one unit is denoted the master and the other the slave, the master sends serial data to the slave over the sending line, and the slave transfers serial data to the master over the receiving line. Data transmission systems of this type frequently experience breakage or disconnection of transmission lines and transmission errors due to noise or the like, and such occurrences must be detected rapidly to preclude erroneous equipment operation.

Various systems have been put into practice to check for transmission errors. One such system adds a parity bit to the data. However, this does not permit a transmission error to be detected if the even-numbered bit in the received serial data has undergone a change in sign, nor does it permit detection of a break or disconnection in the transmission lines.

SUMMARY OF THE INVENTION

Accordingly, it is an object of the present invention to provide a method and system for the transmission of serial data, enabling a transmission error to be detected in a reliable manner if at least one of the bits in N-bit serial data experiences a transmission error.

It is another object of the present invention to provide a method and system for the transmission of serial data, which detect a break or disconnection in transmission lines, specifically sending, receiving and strobe lines, in a reliable manner.

It is still another object of the present invention to provide a method and system for the transmission of serial data, which both reduce the wasteful use of data transmission time and detect transmission errors and breakage of transmission lines in a reliable manner.

It is a further object of the present invention to provide a method and system for the transmission of serial data, which prevent erroneous system operation due to transmission errors or line breakage.

Other features and advantages of the invention will be apparent from the following description taken in connection with the accompanying drawings.

DETAILED DESCRIPTION OF THE PREFERRED EMBODIMENT

Figure 1:
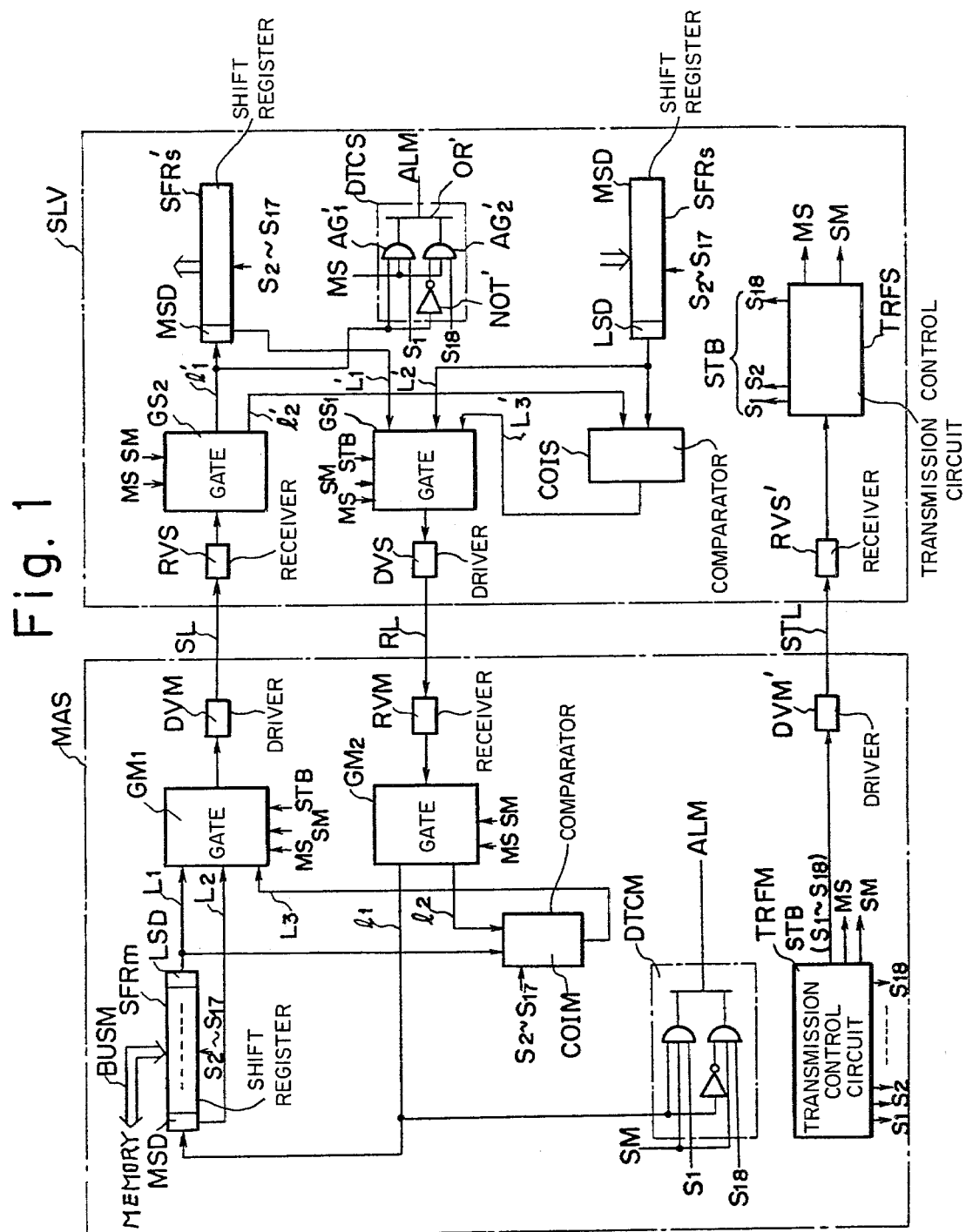
FIG. 1 is a circuit block diagram showing an embodiment of the electrical system of a serial data transmission system in accordance with the present invention.
Figure 2A:
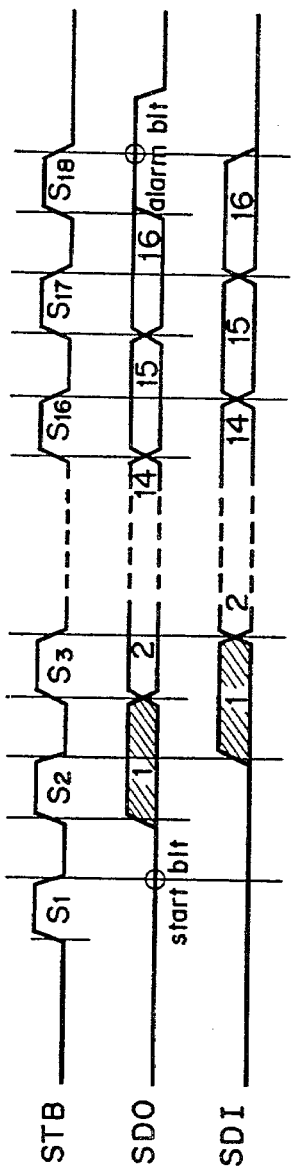
FIGS. 2A and 2B are waveform diagrams of various signals carried over the sending, receiving and strobe lines, FIG. 2A showing waveforms of signals when serial data is sent from a master to a slave, and FIG. 2B showing waveforms of signals when serial data is sent from the slave to the master.
Figure 2B:
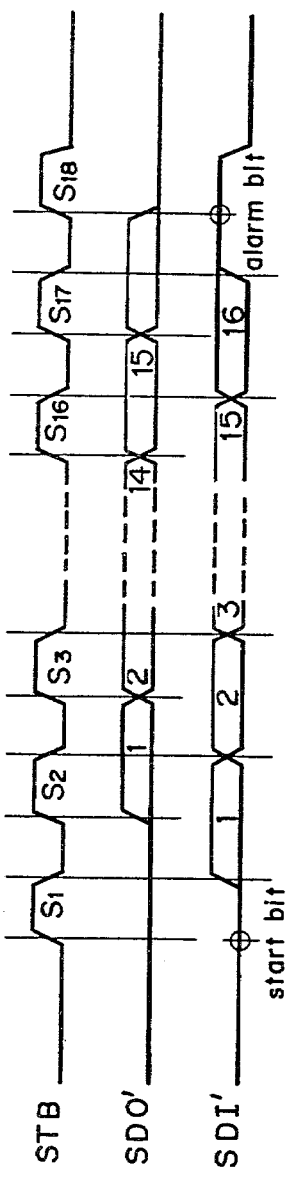

In FIGS. 1 and 2, serial data is exchanged between a master unit MAS and a slave unit SLV. A sending line SL transmits the serial data from the master MAS to the slave SLV, and a receiving line RL transmits the serial data from the slave SLV to the master MAS. As the serial data is being sent and received, strobe pulses STB consisting of 18 pulses $S_1$ through $S_{18}$, generated by a transmission control circuit TRFM which is located in the master MAS, and which will be described in more detail later, are sent to the slave SLV through a strobe line STL, the pulses being delivered in synchronism with the serial data. A shift register SFRm is supplied with 16-bit parallel data, to be sent to the slave SLV, which is transmitted over a bus line BUSM from a memory (not shown). The 16-bit parallel data is set in the register SFRm and is converted thereby into serial data SDO (FIG. 2A) one bit at a time in synchronism with shift pulses (the strobe pulses). The serial data is delivered to the slave SLV. In addition, serial data SDI' (FIG. 2B) sent from the slave SLV is stored in the shift register SFRm from the most significant digit MSD while being shifted one bit at a time in synchronism with shift pulses, the shift register sending the data out on the bus line BUSM as parallel information upon receipt of 16 bits.

The transmission control circuit TRFM generates signals MS, SM which indicate the direction in which serial data is to be transmitted, as well as strobe pulses STB, shown in FIG. 2, consisting of 18 pulses $S_1$ through $S_{18}$, these strobe pulses being generated as the master MAS sends N-bit serial data to the slave SLV, namely when signal MS is at logical "1," and as the N-bit serial data is received from the slave SLV, namely when signal SM is at logical "1." The transmission control circuit TRFM sends these strobe pulses STB to the slave SLV. The shift register SFRm located in the master MAS operates in synchronism with the positive-going transitions of the strobe pulses $S_2$ through $S_{17}$, whereas a shift register which is located in the slave SLV, and which will be described later, operates in synchronism with the negative going transitions of the strobe pulses STB.

A comparator COIM compares sequentially the content of each bit in the N-bit serial data SDO sent from the master MAS to the slave SLV, and the content of each bit in the serial data SDI sent back to the master MAS each time the slave SLV receives one bit. The comparator COIM, after N bits have been sent from the master to the slave, delivers a signal comprising a logical "1" if all N bits in the sent and returned serial data were in agreement, but produces an alarm signal comprising a logical "0" if there was a discrepancy of even one bit in the sent and returned N-bit data.

GM$_1$ and GM$_2$ denote gate circuits. When serial data SDO is transmitted from the master to the slave, i.e., when signal MS is logical "1," the gate circuit GM$_1$ supplies the sending line SL with (N+2)-bit serial data SDO (FIG. 2A) comprising a 1-bit start bit, N-bit serial data, and the 1-bit alarm bit, whereas when serial data SDI' is being received from the slave, i.e., when signal SM is logical "1," the gate circuit GM$_1$ supplies the sending line SL with the content of the most significant digit MSD of the shift register SFRm each time the bit is received. The bit content of the start bit is logical "0." Thus, when signal MS is a "1," the gate circuit $GM_1$ transmits a "0" in synchronism with the first pulse $S_1$ of the strobe pulses STB, transmits the N-bit parallel data, stored in shift register SFRm, bit-by-bit as serial data in synchronism with the second through 17th pulses $S_2$ through $S_{17}$, and transmits the output of the comparator COIM as an alarm bit in synchronism with the pulse $S_{18}$. On the other hand, when signal SM is a "1," the gate circuit $GM_1$ transmits the content of the most significant digit MSD of the shift register $SFR_m$, each time one bit of data is received from the slave, in synchronism with the pulses $S_2$ through $S_{17}$. The gate circuit $GM_2$ has two functions as described below. When serial data SDO is being transmitted from the master MAS to the slave SLV (i.e., when signal MS is logical "1") the slave SLV sequentially sends back to the master MAS, in synchronism with the negative-going transitions of the strobe pulses STB, the bit content which it has received from the master bit-by-bit. This bit content is sent back to the master as the serial data SDI shown in FIG. 2A. The gate circuit $GM_2$ delivers this returning serial data SDI to the comparator COIM over line $l_2$. On the other hand, when serial data SDI' is being sent from the slave SLV to the master MAS (i.e., when signal SM is logical "1") the gate circuit $GM_2$ applies the serial data SDI' to the shift register SFRm as the most significant digit MSD.

A detection circuit, designated DTCM, is adapted to detect transmission errors, as well as a break in the sending line SL, receiving line RL and strobe line STL, when serial data is being sent from the slave to the master, that is, when SM is a "1." More specifically, the arrangement is such that the slave will send the 1-bit start bit at logical "0" before it sends the N-bit serial data, and the 1-bit alarm bit, which will be logical "1" in the absence of a transmission error, after it has sent the N-bit serial data. In the event of a transmission error or line breakage, however, the master MAS will receive the start bit, which will be logical "1," or the alarm bit, which will be logical "0," this being detected by the detection circuit DTCM as a transmission error or line breakage in a manner which will be described below. DVM, DVM' denote drivers, and RVM denotes a receiver.

Shift registers in the slave SLV are denoted at SFRs and SFRs'. The 16-bit parallel information which is to be transmitted from the slave SLV to the master MAS is set in shift register SFRs. Once this has been accomplished the information is converted into the serial data SDI' bit-by-bit in synchronism with the shift pulses $S_2$ through $S_{17}$, namely the strobe pulses STB, and is delivered to the master MAS. These signals are shown in FIG. 2B. The shift register SFRs', while shifting bit-by-bit in synchronism with the shift pulses $S_2$ through $S_{17}$ the serial data SDO which arrives from the master MAS, stores the data from the most significant digit MSD and delivers it as parallel information after the 16 bits have been received. A comparator COIS compares sequentially the content of each bit in the N-bit serial data SDI' which the slave sends to the master, and the content of each bit in the serial data SDO' which the master sends back to the slave each time the master receives one bit. After N bits have been sent from the slave to the master, the output of comparator COIS will be logical "1" if all N bits in the sent and returned serial data were in agreement, and logical "0," namely an alarm bit, if there was a discrepancy of even one bit in the sent and returned N-bit data.

$GS_1$ and $GS_2$ denote gate circuits. When serial data SDI' is transmitted from the slave SLV to the master MAS (i.e., when signal SM is logical "1") the gate circuit $GS_1$ supplies the receiving line RL with (N+2)-bit serial data comprising a 1-bit start bit, N-bit serial data, and the 1-bit alarm bit, whereas when serial data SDO is being received from the master MAS (i.e., when signal MS is logical "1") the gate circuit $GS_1$ supplies the receiving line RL with the content of the most significant digit MSD of the shift register SFRs' each time the bit is received. The bit content of the start bit is logical "0." Thus, when the signal SM is a "1," the gate circuit $GS_1$ transmits a "0" in synchronism with the first pulse of the strobe pulses STB, transmits the N-bit parallel data, stored in shift register SFRs, bit-by-bit as serial data in synchronism with the second through 17th pulses $S_2$ through $S_{17}$, and transmits the output of the comparator COIS as an alarm bit in synchronism with the 18th pulse $S_{18}$. On the other hand, when signal MS is a "1," the gate circuit $GS_1$ transmits the content of the most significant digit MSD of shift register SFRs', each time one bit of data is received from the master, in synchronism with the pulses $S_2$ through $S_{17}$. The gate circuit $GS_2$, on the other hand, functions as follows. When serial data SDI' is being transmitted from the slave SLV to the master MAS (i.e., when SM is logical "1") the master MAS sends back to the slave SLV, sequentially in synchronism with the positive-going transitions of the strobe pulses STB, the bit content which it has received from the slave bit-by-bit, this content being sent back as the serial data SDO'. The gate circuit $GS_2$ delivers this returning serial data SDO' to the comparator COIS over the line $l_2'$. On the other hand, when serial data is being transmitted from the master MAS to the slave SLV (i.e., when signal MS is logical "1") the gate circuit $GS_2$ delivers the serial data SDO to the shift register SFRs'.

A detection circuit, designated DTCS, is adapted to detect transmission errors, as well as a break in the sending line SL, receiving line RL and strobe line STL, when serial data SDO is being transmitted from the master to the slave, that is, when MS is a "1." In particular, the master will send the 1-bit start bit at logical "0" before it sends the N-bit serial data, and the 1-bit alarm bit (which will be logical "1" in the absence of a transmission error) after it has sent the N-bit serial data. In the event of a transmission error or line breakage, however, the slave SLV will receive the start bit, which will be logical "1," or the alarm bit, which will be logical "0," this being detected by the detection circuit DTCS as a transmission error or as line breakage in a manner which is described below. DVS denotes a driver, and RVS, RVS' denote receivers. TRFS denotes a transmission control circuit which receives strobe pulses STB from the transmission control circuit TRFM in the master MAS, and which responds by generating strobe signals STB, as well as signals MS, SM.

The operation of the present invention will now be described in connection with the transmission of N-bit serial data from the master MAS to the slave SLV.

In a case where the master MAS sends N-bit data to the slave SLV, N-bit parallel data (N=16), arriving over bus line BUSM from a memory (not shown), is set in the shift register SFRm. The transmission control circuit TRFM generates the signals MS, SM, at logical "1" and logical "0," respectively, as well as the 18 successive strobe pulses STB, consisting of the pulses $S_1$ through $S_{18}$. The gate circuit $GM_1$ responds by delivering the start bit at logical "0" during the generation of the first pulse $S_1$. The start bit is applied to the detection circuit DTCS through the driver DVM, sending line SL, receiver RVS, gate circuit $GS_2$, and line $l_1'$. Gate circuit $GS_2$ is so controlled that, when MS is a "1," an output will appear on line $l_1'$ only and not on line $l_2'$.

Meanwhile, the transmission control circuit TRFS on the slave side receives the strobe pulses STB over the strobe line STL, and successively generates the strobe pulses STB ($S_1$ through $S_{18}$), as well as the signals MS, SM at logical "1" and logical "0," respectively. These signals are applied to the various circuits in the slave.

The outputs of the AND gates $AG_1'$, $AG_2'$ in the detection circuit DTCS are logical "0" if the slave SLV correctly receives the start bit of "0" logic, so that the output ALM, namely an alarm signal, of the OR gate OR' is logical "0." Hence, no alarm is issued. If there is an error in transmission, however, the bit content of the start bit goes to logical "1," in a manner which will be described later, with the result that the output of AND gate $AG_1'$ goes to logical "1." This causes the output ALM of the OR gate OR' to become logical "1," so that an alarm indication of the transmission error is given.

When the second pulse $S_2$ of the strobe pulses STB is generated, the content of the shift register SFRm is shifted one bit to the right, so that the content of the first bit in the N-bit data, which bit was the least significant digit LSD in the shift register SFRm (the content of the bit being represented by the shaded portion of the signal SDO in FIG. 2A), is set in the shift register SFRs' as the most significant digit MDS. The signal is transmitted via the gate circuit $GM_1'$, driver DVM, sending line SL, receiver RVS, gate circuit $GS_2$, and line $l_1'$. The arrangement is such that gate circuit $GM_1$ delivers only the signal on line $L_1$ when signal MS is a logical "1."

When the slave SLV receives the first bit of the N-bit data, the slave immediately sends the received bit content (represented by the shaded portion of the signal SDI in FIG. 2A) back to the master MAS through the line $L_1'$, gate circuit $GS_1$, driver DVS, and receiving line RL. The arrangement is such that the gate circuit $GS_1$ delivers only the signal which appears on line $L_1'$ when the signal MS is a logical "1." The gate circuit $GM_2$ on the master side, upon receiving the 1-bit information which returns from the slave SLV, delivers this information over line $l_2$ to the comparator COIM which is being fed the serial data SDO. The gate circuit $GM_2$ is controlled so as to deliver the received signal to line $l_2$ only when the signal MS is a logical "1." Since the signal (the shaded portion of signal SDO in FIG. 2A) being sent on line $L_1$ and the signal (the shaded portion of signal SDI in FIG. 2A) returning on line $l_2$ overlap for one-half the period of the strobe pulses, the comparator COIM, upon comparing the two signals, later delivers a signal at logical "1" to line $L_3$. If there is no coincidence, the output of the comparator COIM is "0" and this will be sent out on the line $L_3$ subsequently.

As the content of the shift register SFRm is being shifted bit-by-bit as each of the strobe pulses $S_3$ through $S_{17}$ is generated, the content is delivered as serial data SDO. The shift register SFRs' in the slave, on the other hand, stores the serial data SDO while the content of the register is shifted bit-by-bit. The slave SLV sends the received bit content back to the master MAS as serial data SDI through the line $L_1'$, gate circuit $GS_1$, and driver DVS each time one bit of the data is received from the master. The master MAS, on the other hand, compares the sent signals SDO and the returned signals SDI sequentially bit-by-bit through the comparator COIM.

When the 18th strobe pulse $S_{18}$ is generated, the gate circuit $GM_1$ of the master sends the output of the comparator COIM out on the sending line SL as the alarm bit. The alarm bit is applied to the detection circuit DTCS through the driver DVM, sending line SL, receiver RVS, gate circuit $GS_2$, and line $l_1'$. The alarm bit is logical "1" if there has been no error during the transmission of the N-bit serial data, and logical "0" if a transmission error has occurred. Accordingly, no alarm signal is issued in the absence of a transmission error, i.e., the alarm signal ALM is logical "0." If a transmission error does take place, however, the output of the AND gate $AG_2'$ in the detection circuit DTCS goes to logical "1," so that the circuit issues an alarm signal, i.e., ALM is logical "1." If ALM is logical "0," the content of shift register SFRs' is delivered as parallel data, but there is no output from the shift register SFRs' if ALM is logical "1." Thus, erroneous operation is prevented.

The foregoing operation relates to the transmission of serial data SDO from the master MAS to the slave SLV. It should be noted, however, that the operation is entirely the same for transmission of the serial data SDI' from the slave SLV to the master MAS. The data to be transmitted from the slave SLV to the master MAS is stored in the shift register SFRs of the slave and transmitted bit-by-bit to the shift register SFRm of the master through the receiving line RL.

Detection of a break in the strobe line STL, sending line SL or receiving line RL is performed in the following manner.

A. Break in strobe line STL:

(a) If a break develops in the strobe line STL during the transmission of the serial data SDO from the master MAS to the slave SLV, the response from the slave will be clamped at either logical "0" or logical "1" from the time of the break onward. In other words, a break in the strobe line STL will not permit the strobe pulses STB to be generated on the slave side, thereby preventing the updating of the content of shift register SFRs'. The response of the slave following the occurrence of the break is to send back to the master the content, either logical "1" or logical "0," which was stored in the most significant digit MSD of the shift register SFRs' immediately before the break. The result is a lack of agreement between the serial data SDO which was sent to the slave and the data SDI which was returned by the slave, so that the alarm bit goes to logical "0." The detection circuit DTCs, therefore, issues an alarm as set forth above. Though an alarm cannot be issued if the serial data to be transmitted is all "0"s or all "1"s, such data is transmitted only rarely if at all; hence, in most cases, the alarm signal will be generated upon the completion of transmission. Furthermore, even if the alarm fails to be issued upon the completion of one transmission, the alarm signal will be delivered assuredly following the completion of the next transmission of the serial data SDO.

(b) If a break develops in the strobe line STL during the transmission of the serial data SDI' from the slave SLV to the master MAS, the data to be received by the master is clamped, after the occurrence of the break, in the shift register SFRs as the last significant digit (either logical "0" or logical "1"). If the data is clamped at logical "0," the alarm bit will go to logical "0," and the detection circuit DTCM will issue the alarm when the final strobe pulse $S_{18}$ is generated. If the data is clamped at logical "1," the start bit will go to logical "1," and the detection circuit DTCM will issue the alarm upon the transmission of the subsequent 16-bit serial data SDI'.

B. Break in receiving line RL:

(a) If a break develops in the receiving line RL during the transmission of the serial data SDO from the master to the slave, the data which the master receives from the slave will be clamped at either "1" or "0," so that the detection circuit DTSC issues an alarm in the manner described above in connection with A(a).

(b) If a break develops in the receiving line RL during the transmission of serial data SDI' from the slave to the master, the data which the master receives from the slave will be clamped at either "1" or "0," so that the detection circuit DTCM issues an alarm in the manner described above in connection with A(b).

C. Break in sending line SL:

(a) If a break develops in the sending line SL during the transmission of seral data SDO from the master to the slave, the data which the slave receives from the master will be clamped at either "0" or "1." If the data is clamped at "0," the alarm bit will go to "0" and the detection circuit DTCS will issue the alarm when the strobe pulse $S_{18}$ is generated. If the data is clamped at "1," the start bit will go to "1" and the detection circuit DTCS will issue the alarm upon the transmission of the subsequent serial data SDO.

(b) If a break develops in the sending line SL during the transmission of serial data SDI' from the slave to the master, the data which the slave receives from the master will be clamped at either "0" or "1." The result is a lack of agreement between the serial data which was sent from the slave to the master, and the data (all "1"s or all "0"s) which was returned by the master. Hence, the alarm bit goes to "0" so that the detection circuit DTCM issues the alarm.

It should be noted that while the start and alarm bits are described above are logical "0" and logical "1," respectively, during the normal transmission of serial data, "1" and "0" may be employed as the respective bit logic during normal transmission. It is only necessary that the start and alarm bit logic not be identical.

In accordance with the present invention as described and illustrated above, received data is sent back to the sending side and both the sent and received data are compared, thereby allowing the detection of a transmission error if even one bit in the sent and returned 16-bit serial data is different. Furthermore, a break in the strobe, sending and receiving lines can be detected reliably by transmitting the start bit (either a "0" or a "1") before the transmission of the N-bit data, and by transmitting the alarm bit (either a "1" or a "0") after the transmission of the N-bit data.

It should also be noted that waste of serial data transfer time is reduced, despite the transmission error and line breakage detection capability, because only two bits are added to the N-bit serial data.

As many apparently widely different embodiments of the present invention can be made without departing from the spirit and scope thereof, it is to beunderstood that the invention is not limited to the specific embodiments thereof except as defined in the appended claims.

What we claim is:

1. A serial data transmission method for transmitting N-bit serial data (where N is a positive number) from data sending means to data receiving means through data transmission lines, comprising the steps of:
   (a) sending a start bit from the data sending means to the data receiving means, through a first of the data transmission lines, the start bit having a predetermined logical value and being sent before the transmission of the N-bit serial data;
   (b) detecting, in the receiving means, whether the logical value of the start bit is the predetermined logical value;
   (c) sending, from the data sending means to the data receiving means, the N-bit serial data;
   (d) sending back, from the data receiving means to the data sending means, the contents of the received bit serial each time one bit of the bit serial is received by the data receiving means;
   (e) comparing bit-by-bit, in the data sending means, the bit serial sent to and returned from the data receiving means;
   (f) sending, from the data sending means to the data receiving means, the results of the bit-by-bit comparison as an alarm bit after the transmission of the N-bit serial data;
   (g) detecting the logical value of the alarm bit on the data receiving means side to determine if there are any transmission errors; and
   (h) issuing a first alarm signal if the logical value of the start bit detected in the data receiving means is different from the predetermined logical value.

2. The method according to claim 1, wherein in said step of sending the alarm bit, a signal having a logical value the same as the logical value of the start bit is sent as the alarm bit if at least one bit in the sent and returned serial data is determined in said comparing step to be in non-agreement, whereas a signal having a logical value different from the logical value of the start bit is sent as the alarm bit if all of the bits in the sent and returned serial data are determined in said comparing step to be in agreement.

3. The method according to claim 1, further comprising the step of generating strobe pulses of a predetermined period, wherein the content of the start bit, the N-bit serial data, and the content of the alarm bit are sent in synchronism with the positive-going transitions of the strobe pulses of the predetermined period, and wherein the data received by the data receiving means is sent back in said step d to the data sending means in synchronism with the negative-going transistions of the strobe pulses.

4. The method according to claim 2, further comprising the step of issuing a second alarm signal if the logical value of the alarm bit detected in the receiving means is different from the predetermined logical value.

5. A serial data transmission system, comprising:
   a data sending unit having a first data transmission circuit for sending data;
   a data receiving unit having a first data receiving circuit for receiving said data;
   a first data transmission line for interconnecting said data sending unit and said data receiving unit, said first data transmission circuit transmitting said data including N-bit serial data (where N is a positive number) to said data receiving unit through said first transmission line;
   a second data transmission line, connected to said data receiving unit and said data sending unit, for transmitting data from said data receiving unit to said data sending unit;

a second data transmission circuit, provided in said receiving unit and connected to said second data transmission line, for sending back the bit content of the received N-bit serial data on said second data transmission line to said data sending unit each time one bit of said N-bit serial data is received by said receiving unit;

a second data receiving circuit, provided in said data sending unit and connected to said second transmission line, for receiving the data sent back from said receiving unit through said second data transmission line;

a comparison circuit, provided in said data sending unit and operatively connected to said first data transmission circuit and said second data receiving circuit, for comparing the bit content of the serial data transmitted from said data sending unit to said data receiving unit through said first data transmission line, and the bit content of the serial data sent back to said data sending unit from said data receiving unit through said second data transmission line, and for generating a comparison signal; and a detection circuit provided in said data receiving unit and operatively connected to said first data transmission line;

said first data transmission circuit further comprising means for transmitting a start bit, having a predetermined logical value, before said N-bit serial data is transmitted, and for transmitting, as an alarm bit, the comparison signal after said N-bit serial data has been transmitted;

said detection circuit further comprising means for detecting whether the logical values of said start bit and said alarm bit are predetermined logical values.

6. The system according to claim 5, wherein said first data transmission circuit transmits, as an alarm bit, a signal having a logical value the same as the logical value of said start bit if the comparison signal indicates that at least one bit in the sent and returned serial data is found to be in non-agreement, and transmits, as an alarm bit, a signal having a logical value different from the logical value of said start bit if all of the bits in the sent and returned serial data are found to be in agreement.

7. The system according to claim 5, further comprising:

a transmission control circuit, provided in said data sending unit, for generating strobe pulses; and a third data transmission line, operatively connected to said transmission control circuit and said data receiving unit, for sending said strobe pulses from said transmission control circuit to said data receiving unit;

said data sending unit transmitting the content of said start bit, the N-bit serial data, and the content of said alarm bit in synchronism with the positive-going transitions of said strobe pulses;

said data receiving unit transmitting to said data sending unit, in synchronism with the negative-going transitions of said strobe signals, the bit content of the received serial data each time one bit of said serial data is received by said data receiving unit.

8. A serial data transmission system, comprising:

a data sending unit for sending a first data signal comprising N-bit serial data (where N is a positive integer);

first and second data transmission lines connected to said data sending unit; and a data receiving unit connected to said first and second data transmission lines;

said data receiving unit comprising:

a first data receiving circuit coupled to said first data transmission line for receiving said first data signal; and a first data transmission circuit, coupled to said second data transmission line, for transmitting said first data signal back to said data sending unit;

said data sending unit comprising:

a second data transmission circuit, coupled to said first data transmission line, for transmitting said first data signal;

a second data receiving circuit, coupled to said second data transmission line, for receiving the first data signal which is sent back from said receiving unit, the bit content of said N-bit serial data being returned one bit at a time on said second data transmission line;

a comparison circuit, operatively connected to said second data transmission circuit and said second data receiving circuit, for comparing the bit content of the first data signal to the bit content of the returned first data signal, and for generating a comparison signal; and a detection circuit, operatively connected to said second data receiving circuit, for detecting whether the logic level of said start bit and said alarm bit are of said first logic level and said second logic level, respectively;

said second data transmission circuit further comprising means for transmitting a strobe bit, having a predetermined logical value, before said N-bit serial data is transmitted, and for transmitting, as an alarm bit, the comparison signal, after said N-bit serial data has been transmitted;

said detection circuit further comprising means for detecting whether the logical values of said start bit and said alarm bit are the predetermined logical value.

9. The system according to claim 8, further comprising a third data transmission line connected between said data sending unit and said data receiving unit, wherein said data sending unit further comprises a transmission control circuit, coupled to said third data transmission line and operatively connected to said second data transmission circuit, for generating strobe pulses, said second data transmission circuit transmitting the first data signal in synchronism with the leading edges of said strobe pulses, said first data transmission circuit transmitting the returned first data signal in synchronism with the trailing edges of said strobe pulses.

* * * * *

UNITED STATES PATENT AND TRADEMARK OFFICE
CERTIFICATE OF CORRECTION

PATENT NO. : 4,347,609
DATED : AUGUST 31, 1982
INVENTOR(S) : HIROOMI FUKUYAMA ET AL.

It is certified that error appears in the above-identified patent and that said Letters Patent is hereby corrected as shown below:

Column 4, line 65, delete ",".

Column 5, line 1, "18successive" should be --18 successive--.

Column 6, line 53, "DTCs, therefore," should be --DTCS--.

Column 7, line 12, "DTSC" should be --DTCS--;
line 22, "seral" should be --serial--;
line 41, "are" (first occurrence) should be --as--.

Signed and Sealed this

Eleventh Day of January 1983

[SEAL]

Attest:

GERALD J. MOSSINGHOFF

Attesting Officer　　Commissioner of Patents and Trademarks